Patented Nov. 25, 1941

2,263,746

UNITED STATES PATENT OFFICE 2,263,746

PRESERVATION OF GREEN FODDER

Friedrich Wilhelm Stauf and Georg Janning, Leverkusen I. G.-Werk, Germany, assignors to Winthrop Chemical Company, Inc., New York, N. Y., a corporation of New York No Drawing. Application August 9, 1939, Serial No. 289,178. In Germany August 15, 1938

12 Claims. (Cl. 99—8)

This invention relates to improvements in the preservation of green fodder.

It is known to preserve green fodder by the addition of acids or sugar. The handling of acids is very difficult for the farmer; when using sugar there is lacking the sufficient security on silage.

It has now been found that nitrogen-oxygen compounds which, when added to green fodder, split off an oxide of nitrogen particularly nitrous oxide under the conditions normally prevailing in the green fodder preservation, represent excellent preserving agents for such fodder. Often quantities of far below 1% are sufficient to obtain a silage effect even with plants rich in albumen.

The nitrogen-oxygen compounds found to be most suitable are nitrites such as sodium nitrite, potassium nitrite, calcium nitrite or organic nitrites such as urea nitrite or ethyl nitrite. Furthermore, for instance nitrosylchloride or nitrosylsulfuric acid as well as additional compounds like $FeNOSO_4$ and complex nitrites, for instance, nitrito salts of heavy metals come into consideration. Especially nitrates, such as potassium nitrate, sodium nitrate or calcium nitrate have proved to be suitable. As suitable nitrogen-oxygen compounds of course only those come into question in which the residue linked to the nitrogen-oxygen group has no injurious effect on animals.

It is surprising that the group splitting off the oxide of nitrogen can no longer be chemically detected in the forage after a few days. An injurious effect, for instance by nitrites, is therefore excluded.

The nitrogen-oxygen compounds may be used as green fodder preserving agents in the usual manner, for instance by watering the green fodder with an aqueous solution of the nitrogen-oxygen compound. It has proved to be particularly advantageous to strew into the fodder to be stored dry preparations of the said compounds. By the last-mentioned manner of application the nitrogen-oxygen compounds are suitably diluted with solid carriers in order to obtain a homogeneous distribution. As such diluents, for instance inert carriers, which act simultaneously as absorbents, such as diatomaceous earth, active carbon, silica, bleaching earths, such as fuller's earth come into question. Also mineral salts which are important for the nutrition of cattle, such as for instance non-acid reacting phosphates, chlorides or sulfates, as well as other agents suited as green fodder preserving agents, for instance formates sugar or wood sugar, can be mixed with the nitrogen-oxygen compounds to be used according to the present invention. The diluents and solvents for the nitrogen-oxygen compounds have to be so chosen that the oxide of nitrogen is not prematurely freed from the nitrogen-oxygen compounds.

It has further been found that by using substances splitting off an oxide of nitrogen under the conditions normally prevailing in the green fodder preservation, particularly good results are obtained if the ensilage is performed in the simultaneous presence of ammonium ions. This process is of considerable importance when using nitrates as compounds splitting off the oxide of nitrogen.

Thus, for instance, ammonium nitrate, urea nitrate or ammonium nitrite may be used as green fodder preserving agents. Especially good results are obtained on silage when using mixtures of ammonium-free compounds splitting off the oxide of nitrogen, particularly nitrates, and ammonium salts, as the speed of the splitting off of the oxide of nitrogen can be regulated by the addition of the ammonium salt.

The splitting off of oxides of nitrogen during the process of preserving green fodder may be detected by the usual methods of analytic chemistry. The simplest manner consists in providing the closed silo with a tube containing an acidulated solution of potassium iodide and some starch. The evolution of nitrous oxide is revealed by a blue coloration of the solution.

The invention is illustrated by the following examples without, however, restricting it thereto:

Example 1

0.03% of sodium nitrite in aqueous solution are added in the usual manner to 1000 kgs. of freshly cut clover. After 4 weeks the silo is opened and a silage fodder with a pH=4,2, 1.93% of lactic acid and 0.50% of acetic acid is obtained. Neither nitrite nor nitrate could be detected in the fodder.

Example 2

A mixture of 2 kgs. of sugar and 0.3 kgs. of sodium nitrite is added to 1000 kgs. of freshly cut clover by strewing in the usual manner. After 6 weeks the silo is opened and a silage fodder with a pH=4,4, 1.59% of lactic acid and 0.42% of acetic acid is obtained. Nitrite and nitrate could not be detected in the forage.

Example 3

A mixture of 2 kgs. of calcium phosphate and 0.3 kg. of sodium nitrite is added to 1000 kgs. of freshly cut clover in a silo by strewing in the usual manner. After 6 weeks the silo is opened and a silage fodder with a pH=4.38, 1.50% of lactic acid and 0.46% of acetic acid is obtained.

Example 4

0.10% of nitrosyl sulfuric acid are used to 1000 kgs. of freshly cut clover which had been brought into a silo. After 6 weeks the silo is opened and a silage fodder with a pH=4.13, 1.50% of lactic acid and 0.05% of acetic acid is obtained. Nitrite and nitrate could not be detected in the forgage.

Example 5

0.1% of nitrosylchloride are added to 1000 kgs. of freshly cut clover which had been brought into a silo. After 6 weeks the silo is opened and a silage fodder obtained with a pH=4.1, 1.29% of lactic acid and 0.48% of acetic acid. Nitrite and nitrate could not be detected in the forage.

Example 6

0.1% of sodium nitrate, dissolved in water, are added in the usual manner to 1000 kgs. of freshly cut clover which had been put into a silo. After 6 weeks the silo is opened and a silage fodder obtained with a pH=4.6, 1.7% of lactic acid and 0.56% of acetic acid. Nitrite and nitrate could not be detected in the forage.

Example 7

A mixture of 1.5 kgs. of calcium formate, 0.5 kg. of sodium formate and 0.3 kg. of sodium nitrate, dissolved in water, is added in the usual manner to 1000 kgs. of freshly cut clover which had been put into a silo. After 6 weeks the silo is opened and a silage fodder obtained with a pH=4.31, 1.42% of lactic acid and 0.39% of acetic acid. Nitrite and nitrate could not be detected in the forage.

Example 8

2 kgs. of a mixture consisting of 6 parts of sodium nitrate, 1 part of ammonium chloride, 20 parts of calcium formate and 20 parts of calcium phosphate are added to 1000 kgs. of freshly cut clover. The finished fodder contains 1.6% of lactic acid, 0.3% of acetic acid and is free from butyric acid. Nitrite and nitrate could not be detected in the forage.

Example 9

A mixture of 1.5 kg. of calcium formate, 0.8 kg. of sodium nitrate and 0.4 kg. of secondary calcium phosphate is added to 1000 kgs. of freshly cut clover by strewing in the usual way.

After 6 weeks the silo is opened and a silage fodder obtained with a pH=4.2, 1.5% of lactic acid and 0.45% of acetic acid. Neither butyric acid nor nitrite or nitrate could be detected in the forage.

We claim:

1. As a new composition of matter suitable as medium for preserving green fodder a mixture comprising a nitrate, the $NO_3$-group of which is linked to a physiologically innoxious radical, and a preponderant quantity of a solid carrier.

2. As a new composition of matter suitable as medium for preserving green fodder comprising a mixture of a nitrate, the $NO_3$-group of which is linked to a physiologically innoxious radical, an ammonium compound and a preponderant quantity of a solid carrier.

3. As a new composition of matter suitable as medium for preserving green fodder comprising a mixture of sodium nitrate, an ammonium compound and a preponderant quantity of a solid carrier.

4. As a new composition of matter suitable as medium for preserving green fodder a mixture comprising a nitrate, the $NO_3$-group of which is linked to a physiologically innoxious radical, and a preponderant quantity of a solid formate.

5. As a new composition of matter suitable as medium for preserving green fodder a mixture comprising a nitrate, the $NO_3$-group of which is linked to a physiologically innoxious radical, and a preponderant quantity of solid calcium formate.

6. The process for preserving green fodder which comprises adding to the green fodder to be preserved a nitrate, the $NO_3$-group of which is linked to a physiologically innoxious radical.

7. The process for preserving green fodder which comprises adding to the green fodder to be preserved a nitrate, the $NO_3$-group of which is linked to a physiologically innoxious radical, and ammonium ions.

8. The process for preserving green fodder which comprises adding to the green fodder to be preserved an ammonium-free nitrate, the $NO_3$-group of which is linked to a physiologically innoxious radical, and an ammonium compound.

9. As a new composition of matter suitable as medium for preserving green fodder a mixture comprising an inorganic nitrate, the $NO_3$ group of which is linked to a physiologically innoxious radical, and a preponderant quantity of a solid carrier.

10. As a new composition of matter suitable as medium for preserving green fodder a mixture comprising sodium nitrate and a preponderant quantity of an inert carrier.

11. The process for preserving green fodder which comprises adding to the green fodder to be preserved an inorganic nitrate, the $NO_3$ group of which is linked to a physiologically innoxious radical.

12. The process for preserving green fodder which comprises adding to the green fodder to be preserved sodium nitrate.

FRIEDRICH WILHELM STAUF.
GEORG JANNING.